United States Patent
Chess et al.

(10) Patent No.: US 11,678,651 B1
(45) Date of Patent: Jun. 20, 2023

(54) ON BOARD CHUMMING SYSTEM FOR A BOAT AND BOAT HAVING SAME

(71) Applicants: Amos Chess, Oakland Park, FL (US); Mark Delany, Cape Town (ZA)

(72) Inventors: Amos Chess, Oakland Park, FL (US); Mark Delany, Cape Town (ZA)

( * ) Notice: Subject to any disclaimer, the term of this patent is extended or adjusted under 35 U.S.C. 154(b) by 0 days.

(21) Appl. No.: 17/982,636

(22) Filed: Nov. 8, 2022

(51) Int. Cl.
*A01K 97/02* (2006.01)
*B63B 35/14* (2006.01)

(52) U.S. Cl.
CPC ............ *A01K 97/02* (2013.01); *B63B 35/14* (2013.01)

(58) Field of Classification Search
CPC ................ A01K 97/02; B63B 35/14
USPC ................. 43/44.99; 114/364, 255
See application file for complete search history.

(56) References Cited

U.S. PATENT DOCUMENTS

| | | | | |
|---|---|---|---|---|
| 695,921 | A * | 3/1902 | Forster | A01K 97/02 43/44.99 |
| 2,090,650 | A * | 8/1937 | Vant | B02C 18/36 241/82.5 |
| 2,243,896 | A * | 6/1941 | Cupples | A01K 61/80 43/44.99 |
| 2,709,869 | A * | 6/1955 | Larson | A01K 97/02 43/44.99 |
| 3,249,257 | A * | 5/1966 | Nolt | A01K 97/02 222/245 |
| 3,459,247 | A * | 8/1969 | Goodman | B02C 18/0092 241/38 |
| 3,680,245 | A * | 8/1972 | Brooks | A01K 85/01 43/44.99 |
| 5,165,198 | A * | 11/1992 | Kilian, III | A01K 97/05 383/41 |
| 5,205,778 | A * | 4/1993 | Korkuch | B26D 3/22 452/155 |
| 5,346,143 | A * | 9/1994 | Askin | B02C 23/36 241/46.06 |
| 5,390,439 | A * | 2/1995 | Kilian, III | A01K 97/05 43/56 |
| 5,720,124 | A * | 2/1998 | Wentzell | A01K 97/02 43/44.99 |
| 5,729,928 | A * | 3/1998 | Anderson | A01K 97/02 43/44.99 |
| 6,012,368 | A * | 1/2000 | Gicesku | A01K 97/02 83/167 |
| 6,014,832 | A * | 1/2000 | Brooks | A01K 97/02 222/401 |

(Continued)

FOREIGN PATENT DOCUMENTS

EP 3420815 A1 * 1/2019
FR 788322 A * 10/1935

(Continued)

*Primary Examiner* — Darren W Ark
(74) *Attorney, Agent, or Firm* — The Concept Law Group, PA; Scott M. Garrett; Scott D. Smiley

(57) ABSTRACT

An on-board chumming system and vessel using same include a generally vertically oriented downtube that connects a feed portion at the top with a comminution chamber at the bottom. A water inlet at the top of the downtube facilitates the bait falling into the comminution chamber to be pulverized and mixed with water to create the chum, which flows out of the comminution chamber through an outlet that passes through a side of the vessel.

18 Claims, 7 Drawing Sheets

(56) References Cited

U.S. PATENT DOCUMENTS

| | | | | |
|---|---|---|---|---|
| 6,581,322 | B1 * | 6/2003 | Spinelli | A01K 97/02 43/44.99 |
| 7,152,363 | B1 * | 12/2006 | Garcia-Cruz | A01K 97/02 43/44.99 |
| 7,181,883 | B1 * | 2/2007 | Nassef | A01K 97/02 43/44.99 |
| D541,368 | S * | 4/2007 | Huffman | D22/134 |
| 7,225,583 | B1 * | 6/2007 | Stacy | A01K 97/02 43/44.99 |
| 8,171,884 | B2 * | 5/2012 | Dornburg | A01K 61/80 119/51.11 |
| 8,667,729 | B2 * | 3/2014 | Coffield | B02C 18/067 43/44.99 |
| 9,155,291 | B1 * | 10/2015 | Russ | A01K 97/02 |
| 10,130,087 | B1 * | 11/2018 | Alas, Jr. | B63B 35/14 |
| 11,241,001 | B2 * | 2/2022 | Smelt | A22C 17/0026 |
| 2004/0003531 | A1 * | 1/2004 | Hulin | A01K 85/01 43/4.5 |
| 2004/0061008 | A1 * | 4/2004 | Hauler | A01K 97/02 241/199.12 |
| 2009/0025271 | A1 * | 1/2009 | Duckworth | A01K 97/05 43/44.99 |
| 2012/0066954 | A1 * | 3/2012 | Barker | A01K 97/02 43/42.22 |
| 2012/0233906 | A1 * | 9/2012 | Leister | A01K 97/02 43/44.99 |
| 2013/0133241 | A1 * | 5/2013 | Barker | A01K 91/08 43/44.9 |
| 2014/0202548 | A1 * | 7/2014 | Geerlings | A01K 97/02 137/1 |
| 2016/0113256 | A1 * | 4/2016 | Van Heiningen | A01K 97/02 43/4.5 |
| 2016/0192631 | A1 * | 7/2016 | Jenkins | B65D 83/0005 43/4.5 |
| 2018/0228138 | A1 * | 8/2018 | Smelt | A01K 97/02 |
| 2018/0279596 | A1 * | 10/2018 | Burton | G10K 11/346 |

FOREIGN PATENT DOCUMENTS

| | | | | |
|---|---|---|---|---|
| FR | 1267936 | A * | 7/1961 | |
| FR | 2774259 | A1 * | 8/1999 | A01K 85/01 |
| FR | 3062027 | B3 * | 8/2019 | A01K 97/02 |
| JP | 2018121647 | A * | 8/2018 | |
| JP | 2020115794 | A * | 8/2020 | |
| NL | 1007791 | C2 * | 6/1999 | A01K 91/02 |
| WO | WO-0048459 | A1 * | 8/2000 | A01K 97/02 |
| WO | WO-02056678 | A1 * | 7/2002 | A01K 97/02 |

* cited by examiner

ON BOARD CHUMMING SYSTEM FOR A BOAT AND BOAT HAVING SAME

FIELD OF THE INVENTION

The present invention relates generally to chumming apparatus for attracting fish, and, more particularly, relates to an on board chumming apparatus that automatically mulches bait material and disperses it from a boat.

BACKGROUND OF THE INVENTION

Fishing is a recreation enjoyed by a large number of people around the world, and ranges from simply angling using a cane pole with a line attached to one end, to much more sophisticated operations in which a marine vessel can be outfitted with fish-finding sonar systems, and poles with reels are used to cast or troll bait and lures to catch fish. While finding fish to catch is one aspect of fishing, enticing fish to bite is another matter. Some anglers are content to pass time blindly casting in the hopes of a fish biting their bait/lure, and this can be effective if the angler knows of locations where fish congregate and the times at which that occurs. Others prefer a more active fishing experience and use chum to attract fish. Chum is simply cut pieces of bait that is broadcast into the water near the where the angler is fishing. A common method of chumming is to use a frozen chum block and place it in a mesh bag that is then placed in the water near where the angler is fishing. As the outside of the frozen chum block thaws, pieces of bait are released that can attract fish. The chum creates a chum slick to which bait fish and other small fish may be attracted, which in turn attracts larger fish. In some cases larger fish themselves are also attracted by the oils and particles in a chum slick.

However using a frozen chum block is not always convenient. Often there is no control on the angler's part as to the contents of a frozen chum block. Thus it may contain bait that will attract the type of fish the angler is targeting, or not. Further, the angler has to either dispose of the unused portion of the chum block, or take it back and re-freeze it. Neither of these options are especially desirable considering the cost and inconvenience.

Another option is to manual cut bait into chum. This method allows the angler to select the type of bait to be used. However, manually cutting bait into chum is tedious. It would be possible to grind bait into chum but grinders present a safety hazard. On a boat that could be rolling/pitching on waves and swells, having a grinder on deck is not optimum. Being injured while at sea could mean a substantial delay in getting medical treatment, and a grinder used to grind bait fish is likely to contain infectious pathogens.

Therefore, a need exists to overcome the problems with the prior art as discussed above.

SUMMARY OF THE INVENTION

In accordance with some embodiments of the inventive disclosure, there is provided an on-board chumming apparatus for a boat which includes a downtube having a top end and a bottom end, a water inlet coupled to the downtube at the top end, a feed portion attached to the top end of the downtube that is configured to direct bait into the downtube, a comminution chamber coupled to the bottom end of the downtube that includes a comminution mechanism configured to comminute bait dropped into the feed portion, and a water outlet at a side of the comminution chamber that is positioned below the comminution mechanism.

In accordance with a further feature, the feed portion has a funnel shape.

In accordance with a further feature, the feed portion has a lower end configured to fit over the top end of the downtube.

In accordance with a further feature, there is further includes a gasket between an inside wall of the lower end of the feed portion and an outside wall of the downtube at the top end of the downtube.

In accordance with a further feature, the downtube has an inner diameter of not greater than seventy millimeters.

In accordance with a further feature, the downtube has a length, from the top end to the bottom end, of at least fifty centimeters.

In accordance with a further feature, there is further includes a water diverter mounted in the downtube at the top end of the downtube positioned in front of the water inlet and configured to divert water from the water inlet in a first side direction and a second side direction that is opposite the first side direction, along an inner surface of the downtube.

In accordance with a further feature, the lower end of the of the downtube is connected to the comminution chamber by a joiner section made of rubber.

In accordance with a further feature, the comminution chamber is bell-shaped, with a top end of the comminution chamber having a smaller diameter than a bottom end of the comminution chamber.

In accordance with a further feature, the comminution mechanism comprises a horizontally oriented blade fan.

In accordance with some embodiments of the inventive disclosure, there is provided a marine vessel that includes a hull having a hull side and a water line, a gunwale adjacent the hull side at a top of the hull side. There is also includes an on-board chumming apparatus having a downtube having a top end and a bottom end, a water inlet coupled to the downtube at the top end, a feed portion attached to the top end of the downtube that is configured to direct bait into the downtube, the feed portion having a top end that is mounted in an opening in the gunwale;

a comminution chamber coupled to the bottom end of the downtube that includes a comminution mechanism configured to comminute bait dropped into the feed portion, a water outlet at a side of the comminution chamber that is positioned below the comminution mechanism and that extends through the hull side at a point above the water line.

In accordance with a further feature, there is further includes a pump connected between a water source and the water inlet which is configured, when activated, to pump water from the water source through the water inlet into the downtube at the top end of the downtube, and a control switch that selectively activates the pump and the comminution mechanism.

In accordance with a further feature, the feed portion has a funnel shape.

In accordance with a further feature, the feed portion has a lower end configured to fit over the top end of the downtube, and further including a gasket between an inside wall of the lower end of the feed portion and an outside wall of the downtube at the top end of the downtube.

In accordance with a further feature, the downtube has an inner diameter of not greater than seventy millimeters.

In accordance with a further feature, the downtube has a length, from the top end to the bottom end, of at least fifty centimeters.

In accordance with a further feature, there is further included a water diverter mounted in the downtube at the top end of the downtube positioned in front of the water inlet and configured to divert water from the water inlet in a first side direction and a second side direction that is opposite the first side direction, along an inner surface of the downtube.

In accordance with a further feature, the lower end of the of the downtube is connected to the comminution chamber by a joiner section made of rubber.

In accordance with a further feature, the comminution chamber is bell-shaped, with a top end of the comminution chamber having a smaller diameter than a bottom end of the comminution chamber.

In accordance with a further feature, the comminution mechanism comprises a horizontally oriented blade fan.

Although the invention is illustrated and described herein as embodied in an on-board chumming apparatus, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
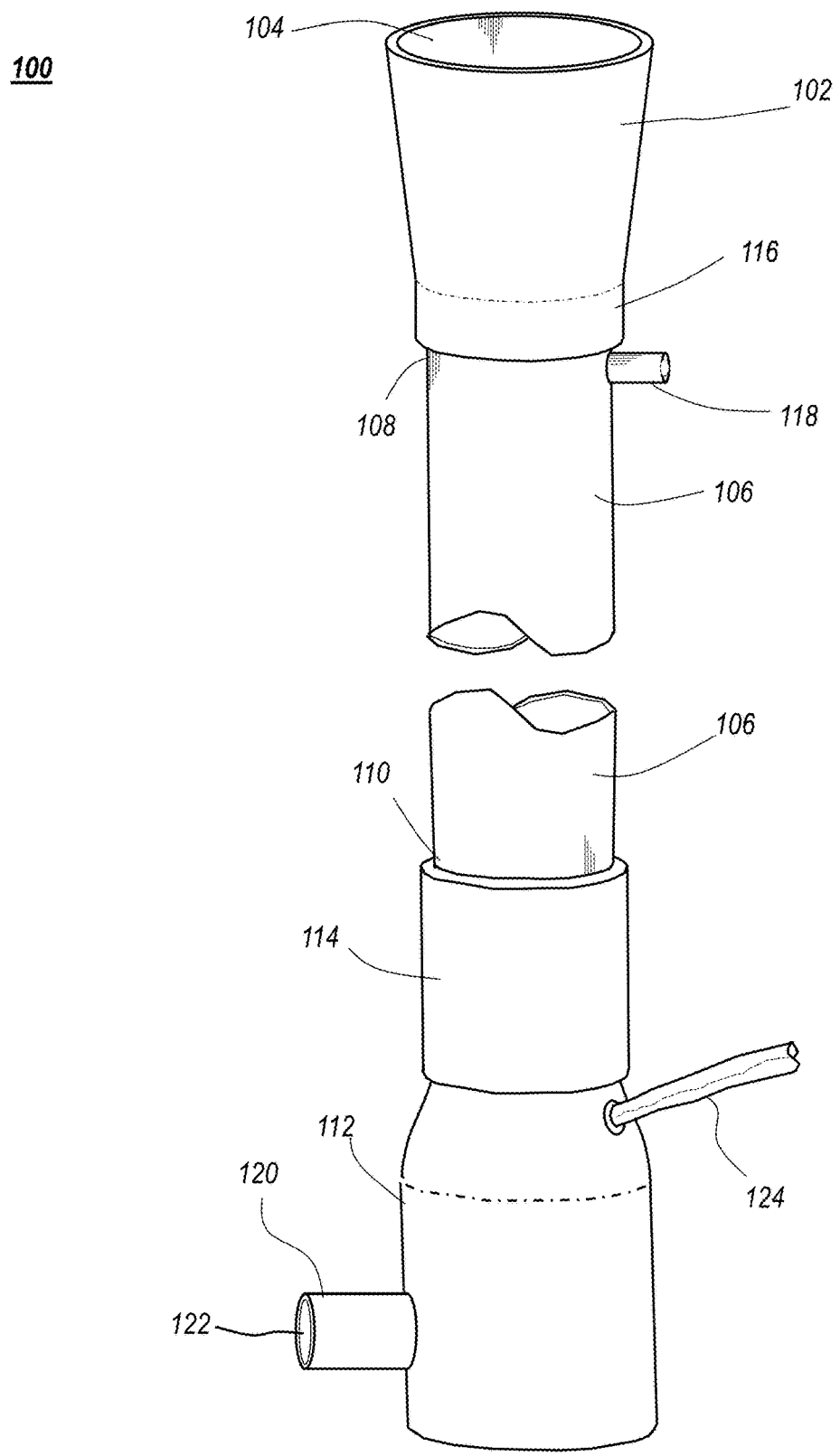
FIG. 1 is a side perspective view of a chumming apparatus for installation on a marine vessel, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is a side perspective view of an on-board chumming apparatus 100 for installation on a marine vessel, in accordance with some embodiments. The chumming apparatus 100 is designed to comminute bait, such as small fish or fish pieces, mix the comminuted bait with water into a chum, and then deliver the chum directly into the water adjacent the marine vessel. At the same time, the design of the chumming apparatus 100 prevents insertion of human limbs into the system 100 for safety, and prevents "splash back" of the chum. The chumming apparatus 100 is intended to be installed in the side of a boat (marine vessel), such as under the gunwale, and eject the chum at the side of the boat.

The on-board chumming apparatus 100 includes a feed portion 102 that is connected to the top end 108 of a downtube 106. The feed portion 102 has an opening 104 at the top of the feed portion 102 to receive bait to be converted into chum. The feed portion 102 can be funnel-shaped where the opening 10 has a larger diameter than the inner diameter of the feed portion 102 at a lower end 116 of the feed portion 102. A water inlet 118 is provided at the top end 108 of the downtube 106. The water inlet 118 can be connected to a pump to provide water under pressure into the interior of the downtube 106. The bottom end 110 of the downtube 106 is connected to a comminution chamber 112 in which the bait is comminuted (pulverized). In some embodiments the comminution chamber 112 can be connected to the bottom end 110 of the downtube 106 by a joiner section 114 that is made of a material like rubber to minimize vibrations of the comminution chamber 112 propagating up the downtube 106. A power cord 124 provides electric power to a comminution mechanism inside the comminution chamber 112 to grind or otherwise reduce the bait into chum with the water being provided at the water inlet 118. A water outlet 120 is connected to the comminution chamber 112 to allow the chum to be expelled though an opening 122. When the on-board chumming apparatus 100 is installed on a boat, the opening 104 of the feed portion 102 can be positioned in the top surface of a gunwale, with the feed portion 102 passing through the gunwale. The water outlet 120 is mounted to pass through a hull side of the boat such that chum being ejected out of the opening 122 lands in the water adjacent the boat.

Figure 2:
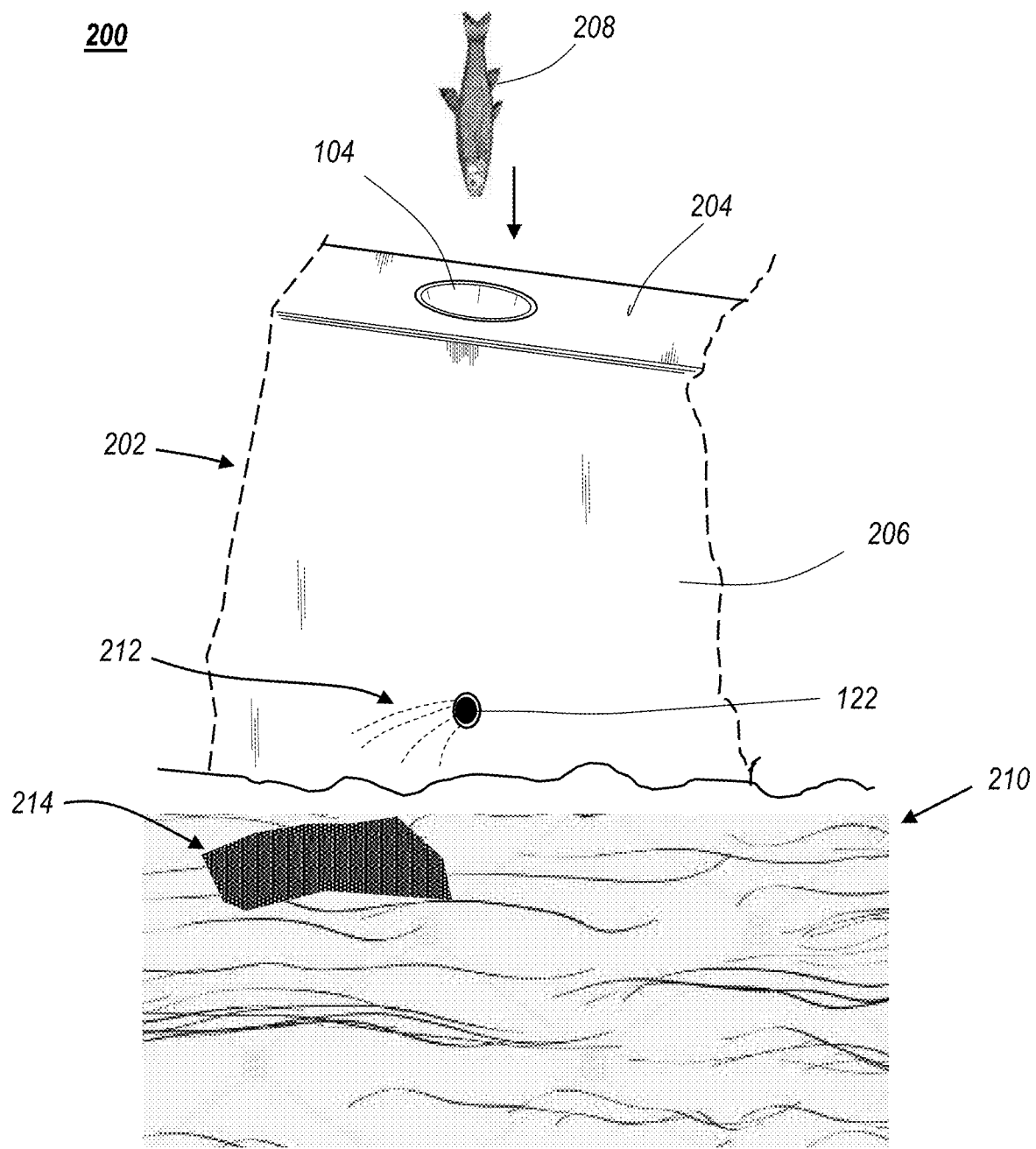
FIG. 2 is a partial side view of a marine vessel using a chumming apparatus in accordance with some embodiments.

FIG. 2 is a partial side view of a marine vessel 200, and in particular a side section of a marine vessel, using a chumming apparatus in accordance with some embodiments. The vessel 200 has a hull 202 having a hull side 206 and a gunwale 204 at the top of the hull side 206. The feed portion of the chumming apparatus 100 is mounted at an opening through the gunwale (in the vertical direction) such that the opening 104 of the feed portion is substantially flush with the top surface of the gunwale 204. Bait 208, such as small baitfish or fish pieces, can be dropped into the opening 104, and will pass through the downtube 106 into the comminution chamber 112 and be comminuted and mixed with water provided by the water inlet 118. The chum 212 will exit the chumming apparatus through opening 122, which is positioned above the water line of the vessel 200, fall into the water 210 and form a chum slick 214. The chum slick 214 is intended to attract fish to the boat so that anglers can cast lures or bait into the water 210 around the chum slick 214 and catch fish. A chum slick often attracts small fish, which eat the small particles of chum, and which in turn attract larger fish that prey on the small fish.

Figure 3:
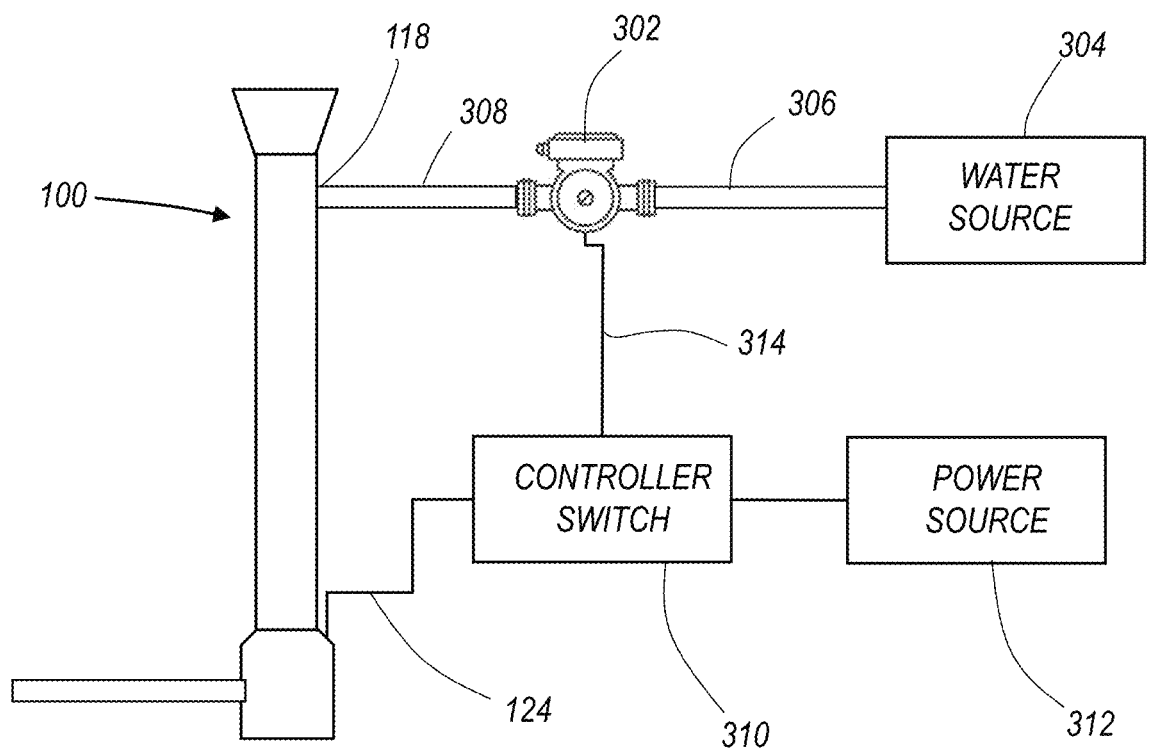
FIG. 3 is a system schematic of a chumming apparatus, in accordance with some embodiments.

FIG. 3 is a system schematic of a chumming system 300, in accordance with some embodiments. The system 300 includes a chumming apparatus 100 which is mounted in a boat, as shown substantially in FIG. 2. A pump 302 is connected to a water source 304 through a first pipe 306. The water source can simply be the water on which the boat is floating, i.e. a port through the hull of the boat. The pump 302 pumps the water through a second pipe 308 that is coupled to the water inlet 118 of the chumming apparatus 100. The pump 302 can be controlled by a controller switch 310 that is coupled to an electric power source 312, such as the boat's battery. The controller switch 310 can be implemented in a variety of configurations, including as a foot switch that can be placed on the deck of the boat. When the controller switch 310 is actuated, power from the power source is provided to the pump 302 through cable 314, causing the pump 302 to pump water from the water source 304 to the water inlet 118 and into the chumming apparatus 100. Likewise, when the controller switch 310 is actuated, power is provided to the comminution mechanism in the chumming apparatus 100 through power cable 124. Thus, several portion of bait can be loaded into the chumming apparatus 100, and then the controller switch 310 can be actuated upon the boat arriving at an ideal location for chumming. Alternatively, the controller switch 310 can be actuated as each piece of bait is dropped into the chumming apparatus 100.

Figure 4:
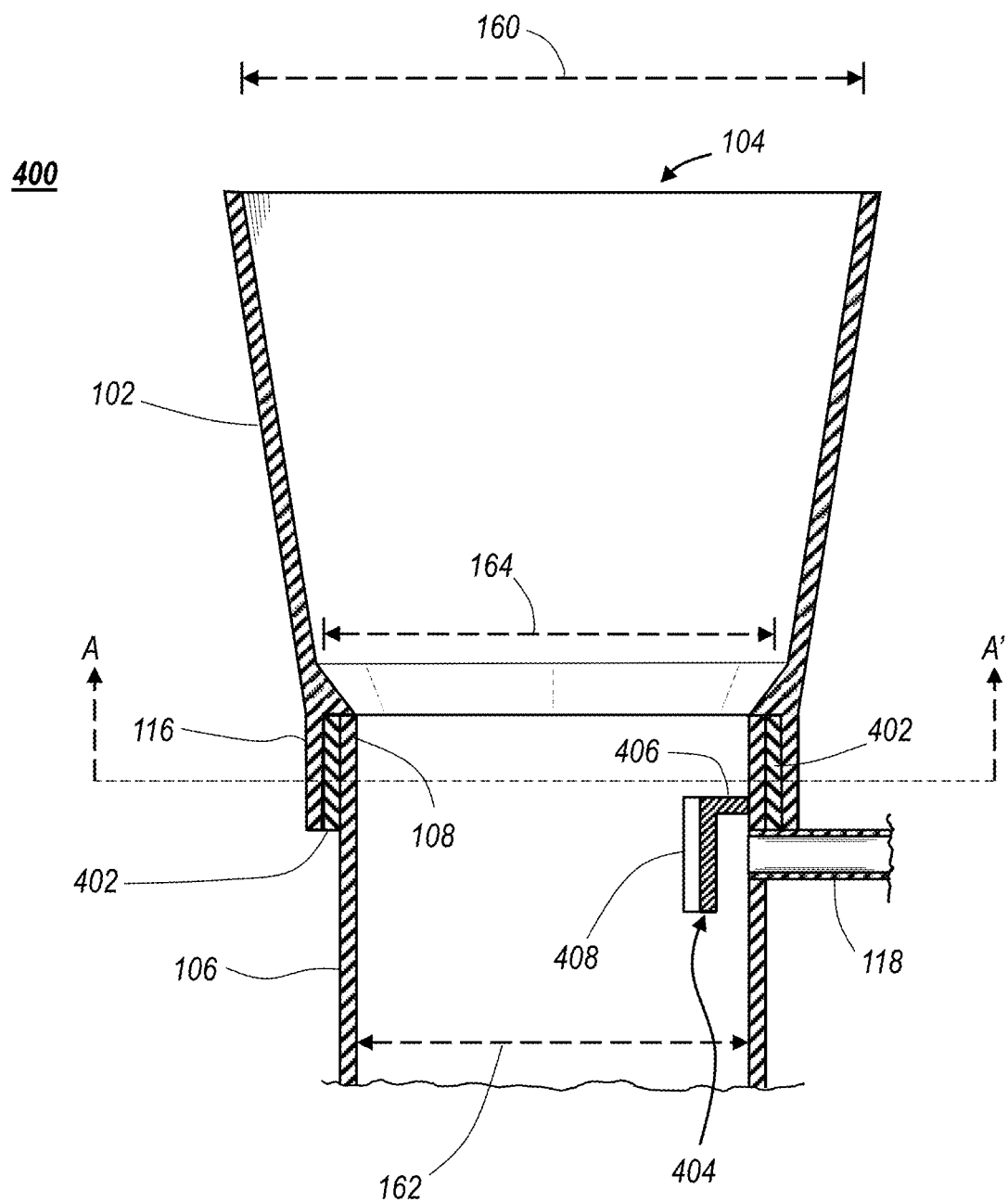
FIG. 4 is central vertical section view of an upper portion of a chumming apparatus, in accordance with some embodiments.

FIG. 4 is central vertical section view of an upper portion 400 of a chumming apparatus 100, in accordance with some embodiments. The section view is taken along a vertical plane centrally through the chumming apparatus 100, and through the water inlet 118, substantially as shown in FIG. 1. The feed portion 102 is attached to the top end of the downtube 106. A lower or bottom portion 116 of the feed portion is substantially cylindrical and fits around the top end 108. A ring gasket 402 can be used between the outer surface of the downtube 106 and the inner surface of the bottom portion 116 of the feed portion 102 to hold the feed portion using friction, without requiring fasteners such as screws or bolts. The opening 104 of the feed portion can have a diameter 160 of about one hundred forty millimeters, which tapers down to a diameter 164 of about ninety millimeters where it tapers inward again to match the inner diameter 162 of the down tube, which can be about seventy millimeters.

Figure 5:
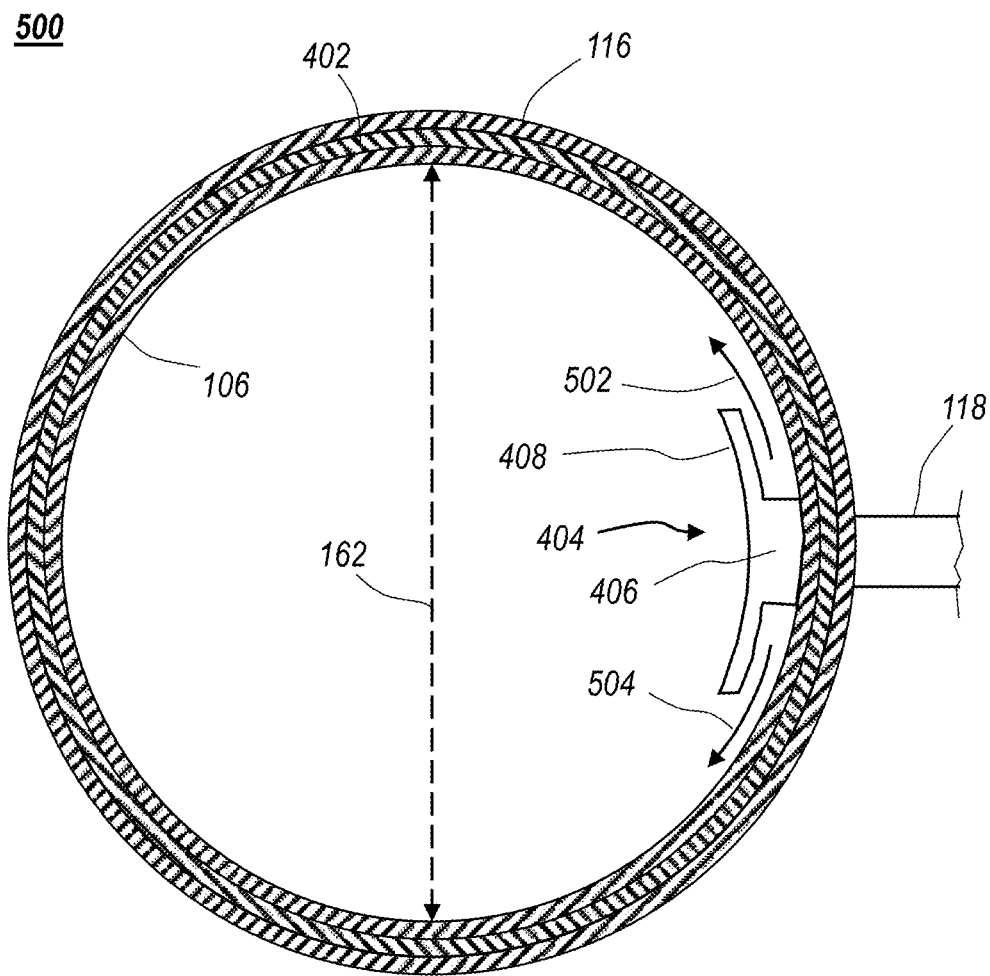
FIG. 5 is a top sectional view taken along plane A-A' in FIG. 4 of a portion of a chumming apparatus, in accordance with some embodiments.

Water is provided into the downtube 106 via the water inlet 118 under pressure, and to prevent the water from splashing up and out of the feed portion, upon striking the opposite side of the downtube 106, a diverter 404 is positioned in the downtube 106 in front of the opening of the water inlet 118 into the downtube 106. The diverter is a rigid member having a horizontal portion 406 that extends from the inner wall of the downtube 106 from a position directly above the opening of the water inlet 118 into the downtube 106. By being directly over the opening of the water inlet 118, water is prevented from spraying upward from the opening of the water inlet 118. In addition, a diverter wall 408 extends downward vertically from the end of the horizontal portion 406 directly in the path of the water stream from the water inlet 118. As shown in FIG. 5, which shows a top sectional view 500 taken along plane A-A' in FIG. 4, the diverter wall 408 can extend outward to the sides on both sides of the opening of the water inlet 118 in the directions of arrows 502, 504. In addition to preventing splashing of the water upwards, it ensures water rinses down to the inside of the downtube 106 to help prevent bait and pieces of bait from sticking to the inside of the downtube 106.

Figure 6:
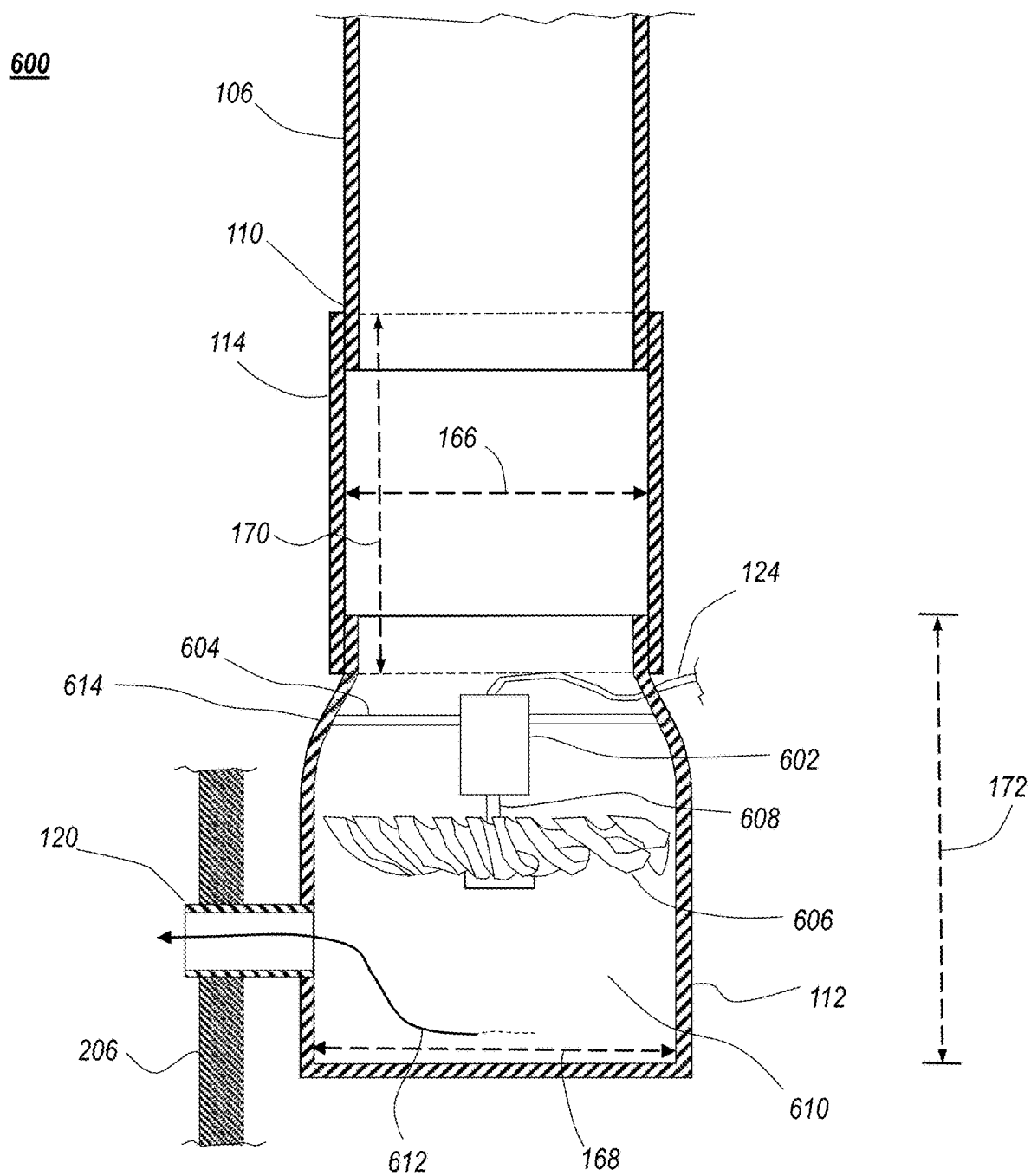
FIG. 6 is a central vertical section view of a lower portion of a chumming apparatus, in accordance with some embodiments.

FIG. 6 is a central vertical section view of a lower portion 600 of a chumming apparatus, in accordance with some embodiments. The view here is taken along the same section plane as in FIG. 4. The bottom or lower end 110 of the downtube 106 is connected to the comminution chamber 112. In order to reduce vibrations being propagated from the comminution chamber 112 up the downtube 106, a joiner section 114 can be used to connect the comminution chamber 112 to the bottom 110 of the downtube 106. The downtube 106, feed portion 102, and comminution chamber 112 can all be made of substantially rigid materials (e.g. metal, PVC), but the joiner section 114 can be made of a less rigid material, such as, for example, rubber. In some embodiments the joiner section 114 can have in internal diameter 166 of about eight millimeters and a height 170 of about one hundred millimeters.

The comminution chamber 112 contains a comminution mechanism that pulverizes bait dropped into the downtube 106 through the feeder section 102 when it falls into the comminution chamber 112. In some embodiments, the comminution mechanism can be comprised of a rotating blade fan 606 that is horizontally oriented and is spun by an electric motor 602 that is held by mounts 604. The blade fan 606 is similar to a fan used to move air, but the blades are substantially stiffer and have sharpened edges for cutting and pulverizing bait, even frozen bait, dropped into the chumming system 100. The motor 602 spins the blade fan 606 by a shaft 608 at a relatively high rate (e.g. 1000 RPM) to ensure that the bait is cut and does not become lodged between the blades. The small pieces of cut bait, along with water provided from the water 118, pass through the blade fan 606 to the bottom 610 of the comminution chamber 112 as a slurry (the chum) of pulverized bait and water. This slurry is then washed out, as indicated by arrow 612, through the outlet 120, which is positioned below the comminution mechanism (e.g. the blade fan 606), and passes through the hull side 206 of the vessel, such that the chum falls into the water in which the vessel is floating. The outside end of the outlet 120 may have a lip at the bottom to prevent the chum from flowing onto the surface of the side of the vessel and ensure it goes into the water. The comminution chamber 112 can have a bottom diameter 168 of about one hundred millimeters, and a height 172 of about one hundred eighty millimeters. The upper sidewalls 614 of the comminution chamber 112 flare outwards, and the angle of the upper sidewalls 614, along with the overall height from the blade fan 606 to the top of the feed portion, prevent bits of pulverized bait from being flung up and out of the feed portion 102.

In general, the dimensions recited herein for the various components server two major purposes. First, the downtube 106 is sized to prevent most adults from being able to insert their hand into the downtube 106. This prevent someone from reaching down into the comminution chamber 112. The length of the downtube 106 should be on the order of about fifty centimeters or more, to prevent children, who might be able to get their hand arm into the downtube 106, from being able to reach the comminution chamber 112. While the diameter of the downtube 106 is selected to prevent an adult from being able to pass their hand through the downtube, it is also large enough to accept most bait fish whole, and larger bait fish can be simply but into sections that will pass through the downtube 106.

Figures 7, 8:
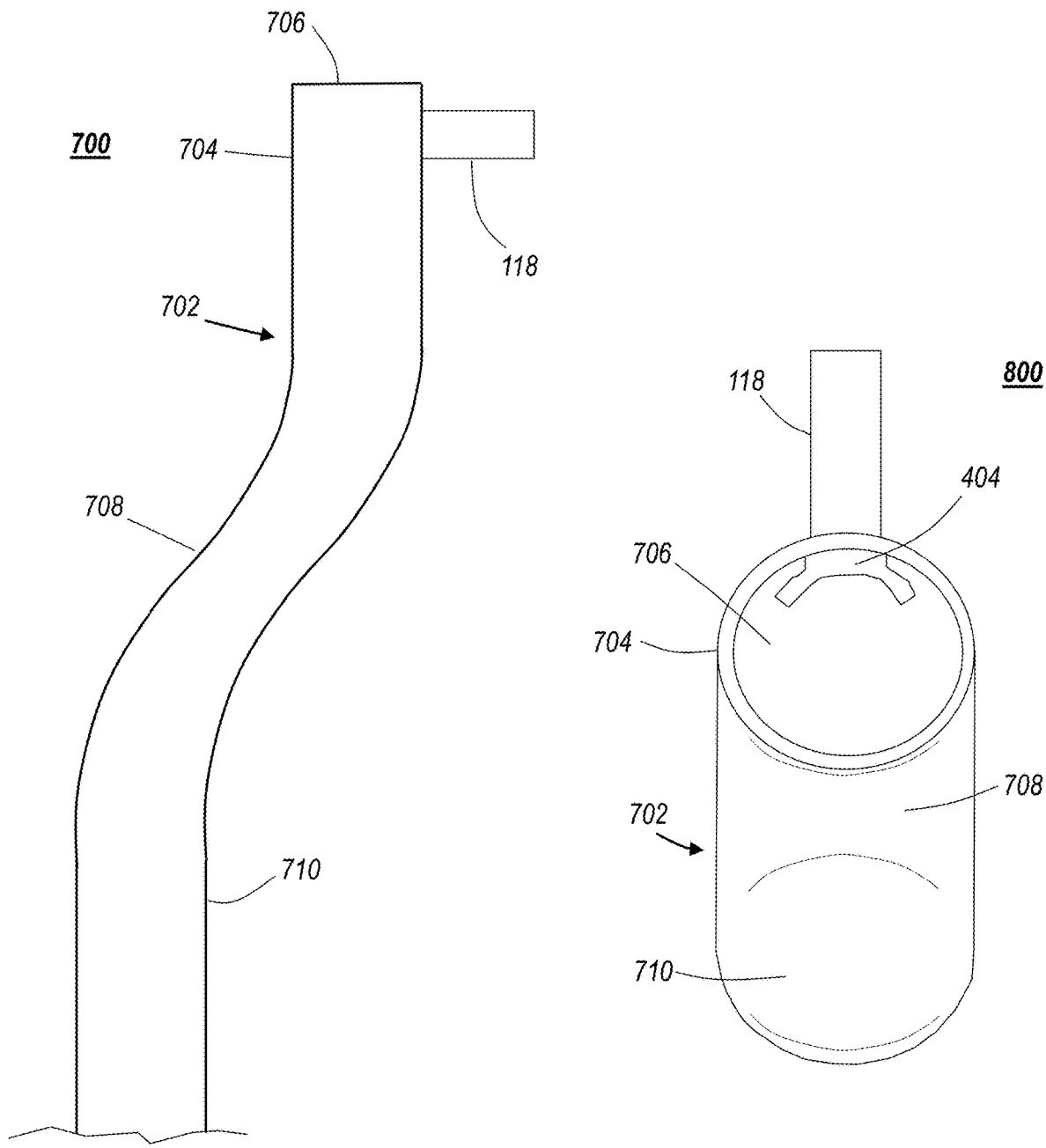
FIG. 7 shows a side view of downtube having a curved section for a chumming apparatus, in accordance with some embodiments.
FIG. 8 is a top view of a downtube having a curved section for a chumming apparatus, in accordance with some embodiments.

FIG. 7 shows a side view 700 of downtube 702 having a curved section 708 for a chumming apparatus, in accordance with some embodiments. FIG. 8 show a top view 800 of the same curved downtube 702. The curved downtube is intended to be connected between a feed portion and a comminution chamber, as with straight downtube 106 of chumming apparatus 100. A top portion 706 can be connected to a feed portion, and includes a water inlet 118 and a diverter 404. The curved downtube 702 includes an upper portion 704, and curved portion 708, and a lower portion 710. The upper and lower portions 704, 710 can be generally straight, but vertically offset, and joined by curved portion 708. The purpose of the curve is to further prevent a person from extending their arm down the curved downtube 702 and reaching the comminution chamber where they could be injured. The angle and length of the curve of the curved section 708 can be selected with this purpose in mind.

A chumming system has been disclosed that can be mounted in a vessel (boat) and that comminutes bait into chum that is then directed overboard through the hull, directly into the water near the vessel to draw fish toward the vessel. The disclosed chumming system is designed to prevent splash back while pulverizing the bait, as well as to provide safety and prevent people from accidently reaching into the chumming system. A water source provides water that is mixed with the pulverized bait to create the chum and carry the pulverized bait overboard.

The claims appended hereto are meant to cover all modifications and changes within the scope and spirit of the present invention.

What is claimed is:

1. An on-board chumming apparatus for a boat, comprising:
    a downtube having a top end and a bottom end;
    a water inlet coupled to the downtube at the top end;
    a water diverter mounted in the downtube at the top end of the downtube positioned in front of the water inlet and configured to divert water from the water inlet in a first side direction and a second side direction that is opposite the first side direction, along an inner surface of the downtube;
    a feed portion attached to the top end of the downtube that is configured to direct bait into the downtube;
    a comminution chamber coupled to the bottom end of the downtube that includes a comminution mechanism configured to comminute bait dropped into the feed portion; and
    a water outlet at a side of the comminution chamber that is positioned below the comminution mechanism.

2. The on-board chumming apparatus of claim 1, wherein the feed portion has a funnel shape.

3. The on-board chumming apparatus of claim 2, wherein the feed portion has a lower end configured to fit over the top end of the downtube.

4. The on-board chumming apparatus of claim 3, further including a gasket between an inside wall of the lower end of the feed portion and an outside wall of the downtube at the top end of the downtube.

5. The on-board chumming apparatus of claim 1, wherein the downtube has an inner diameter of not greater than seventy millimeters.

6. The on-board chumming apparatus of claim 1 wherein the downtube has a length, from the top end to the bottom end, of at least fifty centimeters.

7. The on-board chumming apparatus of claim 1, wherein the bottom end of the downtube is coupled to the comminution chamber by a joiner section made of rubber.

8. The on-board chumming apparatus of claim 1, wherein the comminution chamber is bell-shaped, with a top end of the comminution chamber having a smaller diameter than a bottom end of the comminution chamber.

9. The on-board chumming apparatus of claim 1, wherein the comminution mechanism comprises a horizontally oriented blade fan.

10. A marine vessel, comprising:
   a hull having a hull side and a water line;
   a gunwale adjacent the hull side at a top of the hull side;
   an on-board chumming apparatus, including:
      a downtube having a top end and a bottom end;
      a water inlet coupled to the downtube at the top end;
      a water diverter mounted in the downtube at the top end of the downtube positioned in front of the water inlet and configured to divert water from the water inlet in a first side direction and a second side direction that is opposite the first side direction, along an inner surface of the downtube;
      a feed portion attached to the top end of the downtube that is configured to direct bait into the downtube, the feed portion having a top end that is mounted in an opening in the gunwale;
      a comminution chamber coupled to the bottom end of the downtube that includes a comminution mechanism configured to comminute bait dropped into the feed portion; and
      a water outlet at a side of the comminution chamber that is positioned below the comminution mechanism and that extends through the hull side at a point above the water line.

11. The marine vessel of claim 10, further comprising:
   a pump connected between a water source and the water inlet which is configured, when activated, to pump water from the water source through the water inlet into the downtube at the top end of the downtube; and
   a control switch that selectively activates the pump and the comminution mechanism.

12. The marine vessel of claim 10, wherein the feed portion has a funnel shape.

13. The marine vessel of claim 12, wherein the feed portion has a lower end configured to fit over the top end of the downtube, and further including a gasket between an inside wall of the lower end of the feed portion and an outside wall of the downtube at the top end of the downtube.

14. The marine vessel of claim 10, wherein the downtube has an inner diameter of not greater than seventy millimeters.

15. The marine vessel of claim 10 wherein the downtube has a length, from the top end to the bottom end, of at least fifty centimeters.

16. The marine vessel of claim 10, wherein the bottom end of the downtube is coupled to the comminution chamber by a joiner section made of rubber.

17. The marine vessel of claim 10, wherein the comminution chamber is bell-shaped, with a top end of the comminution chamber having a smaller diameter than a bottom end of the comminution chamber.

18. The marine vessel of claim 10, wherein the comminution mechanism comprises a horizontally oriented blade fan.

* * * * *